(12) United States Patent
Kobayashi et al.

(10) Patent No.: US 10,638,066 B2
(45) Date of Patent: Apr. 28, 2020

(54) IMAGING APPARATUS

(71) Applicant: CANON KABUSHIKI KAISHA, Tokyo (JP)

(72) Inventors: Masahiro Kobayashi, Tokyo (JP); Shoji Kono, Hachioji (JP); Yusuke Yamashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/262,043

(22) Filed: Jan. 30, 2019

(65) Prior Publication Data

US 2019/0246054 A1    Aug. 8, 2019

(30) Foreign Application Priority Data

Feb. 5, 2018 (JP) ................................. 2018-018431

(51) Int. Cl.
*H04N 5/355* (2011.01)
*H04N 5/378* (2011.01)
*H04N 5/359* (2011.01)
*H04N 5/3745* (2011.01)

(52) U.S. Cl.
CPC ......... *H04N 5/35563* (2013.01); *H04N 5/359* (2013.01); *H04N 5/378* (2013.01); *H04N 5/37455* (2013.01); *H04N 5/37457* (2013.01)

(58) Field of Classification Search
CPC ............... H04N 5/35563; H04N 5/359; H04N 5/37455; H04N 5/37457; H04N 5/378
See application file for complete search history.

(56) References Cited

U.S. PATENT DOCUMENTS

| | | |
|---|---|---|
| 6,933,978 B1 | 8/2005 | Suda |
| 7,462,810 B2 | 12/2008 | Kobayashi et al. |
| 7,830,436 B2 | 11/2010 | Sumi et al. |
| 7,928,477 B2 | 4/2011 | Kobayashi et al. |
| 7,935,995 B2 | 5/2011 | Watanabe et al. |
| 8,045,034 B2 | 10/2011 | Shibata et al. |
| 8,063,351 B2 | 11/2011 | Kobayashi et al. |
| 8,174,604 B2 | 5/2012 | Shibata et al. |

(Continued)

FOREIGN PATENT DOCUMENTS

| | | |
|---|---|---|
| EP | 1538827 A1 | 6/2005 |
| JP | 2001-124984 A | 5/2001 |

(Continued)

*Primary Examiner* — Amy R Hsu
(74) *Attorney, Agent, or Firm* — Venable LLP

(57) ABSTRACT

An apparatus including: first and second photoelectric converting portions; a charge detecting portion; a transistor outputting a pixel signal; first and second sampling and holding capacitors; an amplifier; and a controlling unit controlling gain in first and second mode. The pixel signal is one of: a first signal at a time of resetting of charge; a second signal including a charge component of the first photoelectric converting portion and a noise component; and a third signal including the first component, a charge component of the second photoelectric converting portion, and a noise component. In the first mode, the controlling unit uses a first gain. In the second mode, the controlling unit uses second gain to the first signal, third gain to the third signal of the first sampling and holding capacitor, and second gain to the third signal of the second sampling and holding capacitor.

20 Claims, 13 Drawing Sheets

(56) References Cited

U.S. PATENT DOCUMENTS

| | | | |
|---|---|---|---|
| 8,222,682 B2 | 7/2012 | Watanabe et al. | |
| 8,259,206 B1 | 9/2012 | Shibata et al. | |
| 8,289,432 B2 | 10/2012 | Shibata et al. | |
| 8,357,956 B2 | 1/2013 | Kobayashi et al. | |
| 8,456,559 B2 | 6/2013 | Yamashita et al. | |
| 8,507,870 B2 | 8/2013 | Arishima et al. | |
| 8,530,989 B2 | 9/2013 | Kikuchi et al. | |
| 8,552,353 B2 | 10/2013 | Kobayashi et al. | |
| 8,582,009 B2 | 11/2013 | Kono et al. | |
| 8,659,692 B2 | 2/2014 | Matsuda et al. | |
| 8,670,056 B2 | 3/2014 | Kono et al. | |
| 8,687,246 B2 | 4/2014 | Fujimura et al. | |
| 8,710,610 B2 | 4/2014 | Kono et al. | |
| 8,711,261 B2 | 4/2014 | Sumi et al. | |
| 8,723,232 B2 | 5/2014 | Kobayashi et al. | |
| 8,742,359 B2 | 6/2014 | Arishima et al. | |
| 8,836,833 B2 | 9/2014 | Yamashita et al. | |
| 8,884,391 B2 | 11/2014 | Fudaba et al. | |
| 8,913,168 B2 | 12/2014 | Matsuda et al. | |
| 9,088,741 B2 | 7/2015 | Sumi et al. | |
| 9,147,708 B2 | 9/2015 | Okita et al. | |
| 9,153,610 B2 | 10/2015 | Kobayashi et al. | |
| 9,225,923 B2 | 12/2015 | Hashimoto et al. | |
| 9,247,170 B2 * | 1/2016 | Komori | H04N 5/3745 |
| 9,276,027 B2 | 3/2016 | Okita et al. | |
| 9,344,653 B2 | 5/2016 | Shimotsusa et al. | |
| 9,363,450 B2 * | 6/2016 | Nakamura | H04N 5/3559 |
| 9,419,038 B2 | 8/2016 | Kobayashi et al. | |
| 9,445,026 B2 | 9/2016 | Kobayashi et al. | |
| 9,538,112 B2 | 1/2017 | Wada et al. | |
| 9,548,328 B2 | 1/2017 | Hasegawa et al. | |
| 9,716,849 B2 | 7/2017 | Kobayashi et al. | |
| 9,762,840 B2 | 9/2017 | Yamazaki et al. | |
| 9,768,213 B2 | 9/2017 | Soda et al. | |
| 9,818,794 B2 | 11/2017 | Okita et al. | |
| 9,876,975 B2 | 1/2018 | Yoshida et al. | |
| 9,894,295 B2 | 2/2018 | Kawabata et al. | |
| 9,906,743 B2 | 2/2018 | Shimotsusa et al. | |
| 10,009,560 B2 | 6/2018 | Kobayashi et al. | |
| 10,021,321 B2 | 7/2018 | Kawabata et al. | |
| 10,021,328 B2 | 7/2018 | Takada et al. | |
| 10,057,519 B2 | 8/2018 | Kobayashi et al. | |
| 10,158,817 B2 | 12/2018 | Shimotsusa et al. | |
| 10,186,532 B2 | 1/2019 | Kobayashi et al. | |
| 10,205,894 B2 | 2/2019 | Kawabata et al. | |
| 2004/0222351 A1 * | 11/2004 | Rossi | G11C 27/026 250/208.1 |
| 2005/0168605 A1 | 8/2005 | Sumi et al. | |
| 2011/0025420 A1 | 2/2011 | Sumi et al. | |
| 2012/0008030 A1 | 1/2012 | Kono et al. | |
| 2012/0104235 A1 | 5/2012 | Sumi et al. | |
| 2012/0188427 A1 * | 7/2012 | Solhusvik | H04N 5/3559 348/300 |
| 2012/0262613 A1 | 10/2012 | Kono et al. | |
| 2013/0222662 A1 | 8/2013 | Sakurai et al. | |
| 2013/0229555 A1 | 9/2013 | Hashimoto et al. | |
| 2014/0061436 A1 | 3/2014 | Kobayashi | |
| 2015/0062364 A1 * | 3/2015 | Nakamura | H04N 5/3559 348/218.1 |
| 2015/0341580 A1 | 11/2015 | Yamazaki et al. | |
| 2016/0080678 A1 | 3/2016 | Hashimoto et al. | |
| 2016/0270755 A1 * | 9/2016 | Takenaka | G01T 1/20 |
| 2016/0322406 A1 | 11/2016 | Kobayashi et al. | |
| 2017/0104940 A1 * | 4/2017 | Tsukuda | H04N 5/359 |
| 2017/0127002 A1 * | 5/2017 | Eshel | H04N 5/3575 |
| 2017/0359538 A1 | 12/2017 | Kobayashi et al. | |
| 2018/0026073 A1 | 1/2018 | Tsuboi et al. | |
| 2018/0098013 A1 | 4/2018 | Yoshida et al. | |
| 2018/0151616 A1 | 5/2018 | Sekine et al. | |
| 2018/0213167 A1 | 7/2018 | Miki et al. | |
| 2018/0213219 A1 * | 7/2018 | Kono | H04N 17/002 |
| 2018/0277575 A1 | 9/2018 | Ikeda et al. | |
| 2018/0278871 A1 | 9/2018 | Takada et al. | |
| 2018/0295302 A1 | 10/2018 | Kobayashi et al. | |
| 2018/0309946 A1 | 10/2018 | Ohya et al. | |
| 2018/0374886 A1 | 12/2018 | Iwata et al. | |
| 2019/0037161 A1 | 1/2019 | Ikeda et al. | |

FOREIGN PATENT DOCUMENTS

| | | |
|---|---|---|
| JP | 2005-175517 A | 6/2005 |
| JP | 2013-211833 A | 10/2013 |
| JP | 2015-222885 A | 12/2015 |
| JP | 2017-216647 A | 12/2017 |
| WO | 2013/128581 A1 | 9/2013 |

\* cited by examiner

IMAGING APPARATUS

BACKGROUND OF THE INVENTION

Field of the Invention

The present invention relates to an apparatus.

Description of the Related Art

Japanese Patent Application Laid-open No. 2005-175517 discloses a solid-state imaging element including photoelectric converting portions arranged in a matrix form and a pixel signal amplifying unit that operates according to a predetermined gain. Japanese Patent Application Laid-open No. 2005-175517 discloses that the pixel signal amplifying unit processes the output from the photoelectric converting portion according to two readout gains so that signals can be read with a wide dynamic range. Moreover, Japanese Patent Application Laid-open No. 2001-124984 discloses that a plurality of photoelectric converting portions are disposed in one pixel of an imaging apparatus so that focal point is detected on an imaging plane.

Patent Literature 1: Japanese Patent Application Laid-open No. 2005-175517

Patent Literature 2: Japanese Patent Application Laid-open No. 2001-124984

SUMMARY OF THE INVENTION

According to the configuration disclosed in Japanese Patent Application Laid-open No. 2005-175517, although it is possible to obtain an image having an extended dynamic range, since only one gain adjustment unit is used, there is a problem that the frame rate decreases. Moreover, according to the configuration disclosed in Japanese Patent Application Laid-open No. 2001-124984, although it is possible to obtain a signal for detecting focal point, since signals are output from pixels to the following stage in a time-sequential order, the frame rate decreases.

Therefore, when the two technologies are combined to detect focal point on an imaging plane and read signals with a wide dynamic range, there is a problem that the frame rate decreases remarkably. Moreover, sufficient considerations are not taken with regard to noise generated during reading signals which may occur when the two technologies are combined.

The present invention has been made in view of the above-described problems.

An object of the present invention is to provide an imaging apparatus capable of suppressing a decrease in frame rate when detecting focal point on an imaging plane and extending a dynamic range.

The present invention provides an apparatus comprising:

a first photoelectric converting portion and a second photoelectric converting portion;

a charge detecting portion connected in common to the first photoelectric converting portion and the second photoelectric converting portion;

a transistor configured to output a pixel signal corresponding to a potential of the charge detecting portion;

a first sampling and holding capacitor and a second sampling and holding capacitor configured to hold the pixel signal;

an amplifier configured to amplify the pixel signal held in the first sampling and holding capacitor or the second sampling and holding capacitor; and a controlling unit configured to control a gain used when the amplifier amplifies the pixel signal held in the sampling and holding capacitor and perform control in a first mode and a second mode, wherein the pixel signal is any one of:

a first signal corresponding to a potential of the charge detecting portion at time of resetting of the charge detecting portion;

a second signal including a first component based on charges of the first photoelectric converting portion and a noise component based on noise of the charge detecting portion at the time of the resetting; and a third signal including the first component, a second component based on charges of the second photoelectric converting portion, and the noise component, in the first mode, the controlling unit performs control so that the amplifier amplifies, with a first gain, the first signal, the second signal held in the first sampling and holding capacitor, and the third signal held in the second sampling and holding capacitor, and in the second mode, the controlling unit performs control so that the amplifier amplifies the first signal with a second gain, the amplifier amplifies the third signal held in the first sampling and holding capacitor with a third gain lower than the second gain, and the amplifier amplifies the third signal held in the second sampling and holding capacitor with the second gain.

According to the present invention, it is possible to provide an imaging apparatus capable of suppressing a decrease in frame rate when detecting focal point on an imaging plane and extending a dynamic range.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings.

However, the dimensions, materials, shapes, relative positional relationship, and the like of the components described herein may be appropriately changed depending on the structure of the apparatus to which the present invention is applied and various conditions. Therefore, the scope of the present invention is not intended to be limited to the following embodiments.

Embodiment 1

Hereinafter, an imaging apparatus according to Embodiment 1 will be described with reference to the drawings.

Apparatus Configuration

Figure 1:
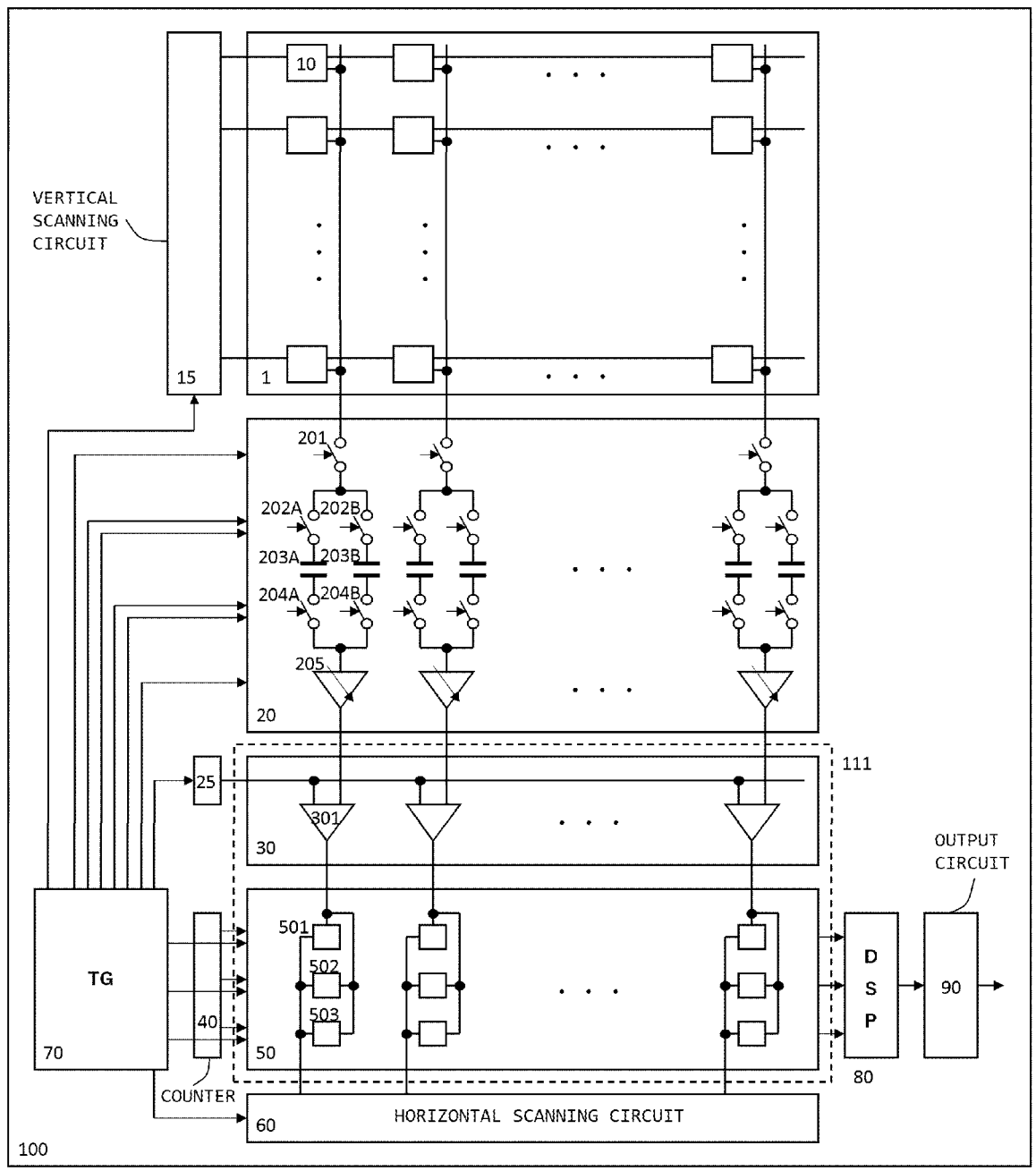
FIG. 1 is a block diagram of an imaging apparatus according to Embodiment 1.

FIG. 1 is a schematic diagram of an imaging apparatus according to the present embodiment. An imaging apparatus 100 is formed on the same semiconductor substrates. The imaging apparatus 100 has a pixel unit 1 in which pixels 10 are arranged in a matrix form. The imaging apparatus 100 of the present embodiment includes one vertical output line, two parallel sampling and holding capacitors, one amplifier, and a following stage circuit with respect to a vertical pixel line.

Figure 2:
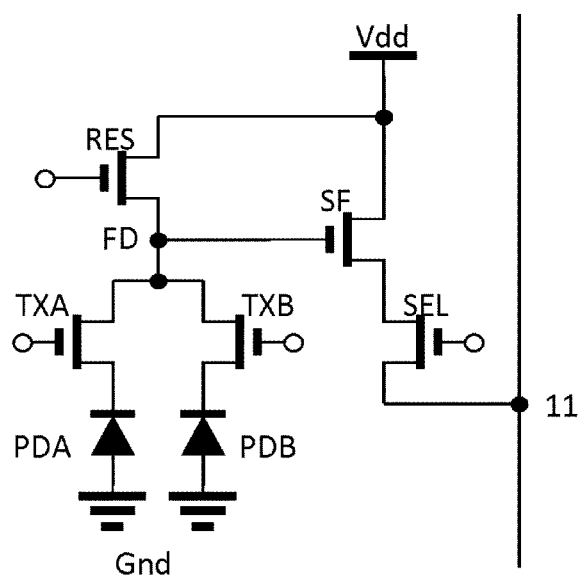
FIG. 2 is a pixel circuit diagram of Embodiment 1.

FIG. 2 illustrates a circuit diagram of the pixels 10. Two photodiodes PDA and PDB are disposed in each of the pixels 10. In this way, focal point detection and imaging can be performed using the pixels 10. In focal point detection, a phase difference between the two photodiodes disposed in the pixel is acquired using the signals of the photodiodes and a focusing position is detected using the phase difference information. The photodiodes PDA and PDB that photoelectrically convert incident light to accumulate signal charges can be referred to as a first photoelectric converting portion and a second photoelectric converting portion. In the respective embodiments to be described later, the photodiodes PDA and PDB are equivalent and are replaceable with each other. The two photodiodes PDA and PDB may be included in separate pixels 10.

The photodiodes PDA and PDB share a common charge detecting portion FD that accumulates charges. The charge detecting portion FD is a charge-voltage converting portion that is connected in common to a plurality of photodiodes to convert charges transferred from the photodiodes to a voltage. The charge detecting portion FD has a floating diffusion structure. TXA and TXB are charge-readout transfer transistors controlled by transfer pulses pTXA and pTXB. RES is a reset transistor controlled by a reset pulse pRES. SF is an amplifying transistor that forms a source follower circuit and outputs a signal corresponding to the charges and the voltage of the FD. SEL is a row selection transistor controlled by a selection pulse pSEL. Since the pixels 10 are arranged in a matrix form, the transfer transistors TXA and TXB, the reset transistors RES, the amplifying transistors, and the row selection transistors SEL included in the pixels 10 are also arranged in a matrix form.

Each of the pixels 10 outputs the signal charges based on the charges photoelectrically converted according to the intensity of incident light to the amplifying unit 20 as a pixel signal via the vertical output line 11 according to scanning of a vertical scanning circuit 15. In the present embodiment, two sampling and holding capacitors 203A and 203B corresponding to the number (two) of photodiodes are present in one vertical output line. Hereinafter, the sampling and holding capacitors will be referred to simply as a capacitor 203A and a capacitor 203B. Moreover, the vertical output line will be referred to simply as an output line. The photoelectric conversion signals output from the pixels 10 include noise signals in addition to the signals based on the signal charges.

The vertical scanning circuit 15 performs scanning for each row of the pixel unit 1 on the basis of a signal output from a timing generator (hereinafter TG) 70. The TG 70 can function as a controlling unit that performs switching and outputs control pulses. Moreover, a processing circuit that functions as a controlling unit separately from the TG 70 or in cooperation with the TG 70 may be provided in the imaging apparatus.

The amplifying unit 20 amplifies the pixel signal and outputs the amplified pixel signal to a comparator 30 having a comparing circuit 301. The amplifying unit 20 is provided in an electrical path between the comparator 30 and the pixel unit 1. The amplifying unit 20 includes switches 201, 202, and 204, a sampling and holding capacitor 204, and a variable gain amplifier 205. The gain of the amplifier can be changed using an existing arbitrary control circuit as a controlling unit. For example, the TG 70 may set the gain. In the respective embodiments to be described later, a plurality of sampling and holding capacitors connected to the same pixel line and arranged in parallel are equivalent and are replaceable with each other. The sampling and holding capacitor 204 includes a first sampling and holding capacitor 204A and a second sampling and holding capacitor 204B.

A reference signal supplying unit 25 outputs a reference signal Vr to the comparators 30 of the respective columns.

The comparator 30 compares the signal output by the amplifying unit 20 with the reference signal Vr. The comparator 30 outputs a comparison result signal indicating the comparison result to a memory unit 50 as a digital value. The comparator 30 functions as an AD converting unit.

The memory unit 50 includes a first memory 501, a second memory 502, and a third memory 503.

A counter 40 outputs a count signal obtained by counting a clock signal CLK to the first memory 501, the second memory 502, and the third memory 503.

The TG 70 outputs signals to respective blocks of the imaging apparatus. The TG outputs signals M1_En, M2_En, and M3_En for enabling writing of data to the respective memories to the first memory 501, the second memory 502, and the third memory 503, for example.

A horizontal scanning circuit 60 sequentially outputs digital signals held by the first, second, and third memories 501, 502, and 503 of each column to a digital signal processor (DSP) 80. The DSP 80 functions as a processing unit, processes signals output from the first, second, and third memories 501, 502, and 503 of each column, and outputs the processed signals to an output circuit 90. The output circuit 90 outputs signals to the outside of the imaging apparatus on the basis of the signals output by the TG 70.

Driving Control in First Mode

Figure 3A:
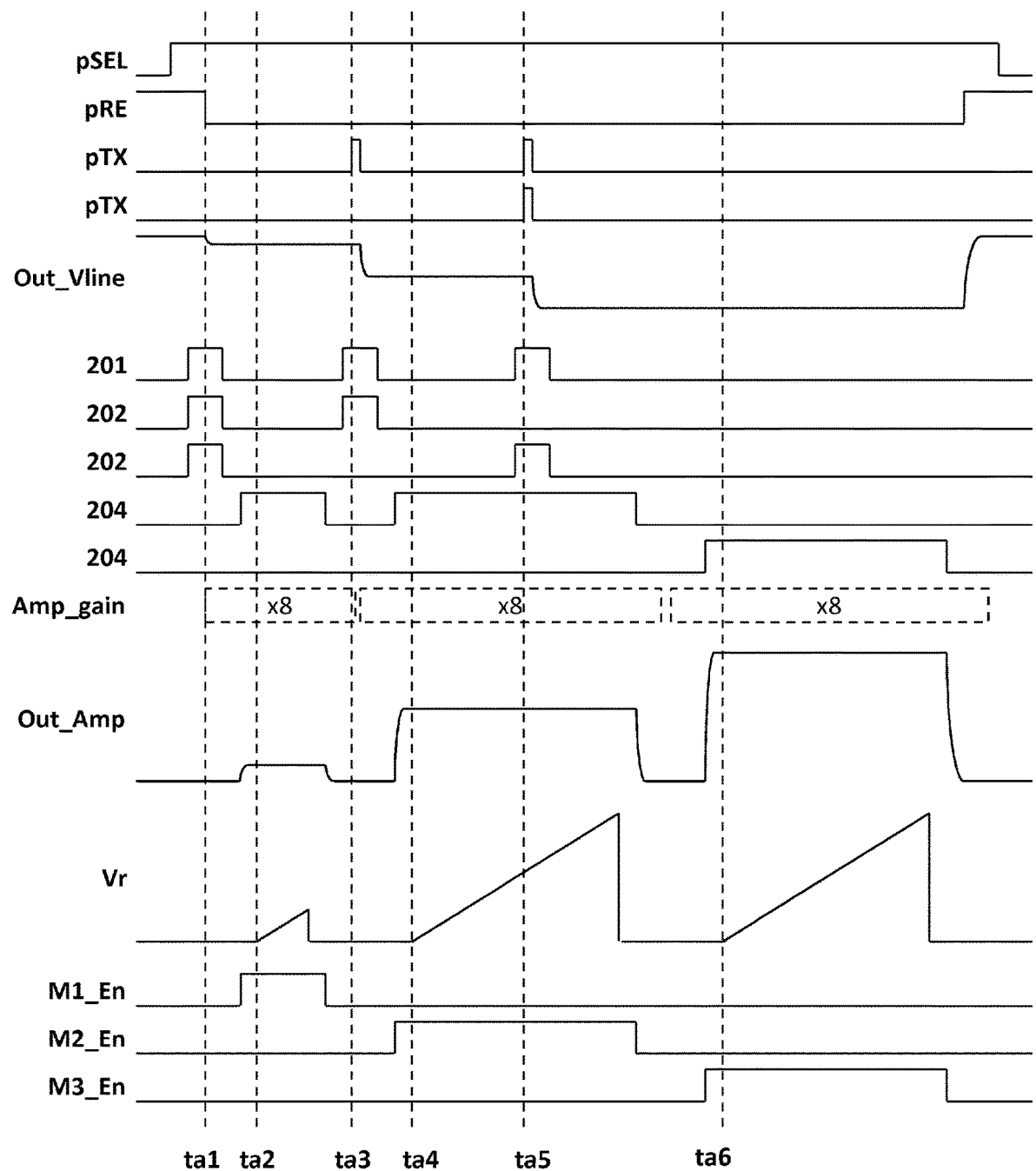
FIG. 3A is a driving timing diagram when imaging and focal point detection is performed according to Embodiment 1.

An operation of pixels in a first mode in which the focal point of an imaging plane can be detected in the imaging apparatus illustrated in FIG. 1 will be described with reference to the driving timing diagram illustrated in FIG. 3A. Out_Vline in FIGS. 3A and 3B indicates a signal (a pixel signal) output by the vertical output line 11. Out_Amp indicates a signal output by the amplifying unit 20. Vr is a reference signal output by the reference signal supplying unit 25. The reference signal Vr is a signal of which the potential changes by a certain amount per unit time.

Pixels 10 of a specific row are selected according to a selection pulse pSEL prior to time ta1.

At time ta1, signals corresponding to noise signals are output from the pixels 10. In this case, the switches 201, 202A, and 202B are in a condition state, and the noise signals are accumulated in the capacitors 203A and 203B.

Ramp-up of the reference voltage Vr and counting of the counter 40 start at time ta2. In this case, the switches 201, 202A, and 202B are in a non-conduction state, and the switch 204A only is in the conduction state. Therefore, a signal obtained by applying a predetermined gain (in this example, ×8) to the signal accumulated in the capacitor 203A is output from the amplifying unit 20 as Out_Amp. The comparator 30 compares the reference voltage Vr with Out_Amp and writes the count signal value in the first memory 501 at a timing at which the reference voltage Vr becomes larger than Out_Amp. That is, when the predetermined gain of ×8 is a first gain and a pixel signal corresponding to noise is a noise signal, the first memory 501 holds a signal value obtained by applying the first gain to the noise signal.

At time ta3, the reference voltage Vr and the counter 40 are reset, the transfer pulse pTXA from the pixel 10 changes to a High state, and the photoelectric conversion signal of the photodiode PDA is output. In this case, the switches 201 and 202A are in the conduction state, and signals and noise signals based on the signal charges of the PDA are accumulated in the capacitor 203A. Hereinafter, the signal based on the signal charge of the photodiode PDA will be sometimes referred to as a "first pixel signal". Moreover, a signal obtained by adding the noise signal and the first pixel signal accumulated in the capacitor 203A will be sometimes referred to as a "first synthesized signal".

Ramp-up of the reference voltage Vr and counting of the counter 40 start at time ta4. In this case, the switches 201 and 202A are in the non-conduction state and the switch 204A only is in the conduction state. Therefore, a signal obtained by applying a predetermined gain (in this example, ×8) to the signal accumulated in the capacitor 203A is output from the amplifying unit 20 as Out_Amp. The comparator 30 compares the reference voltage Vr with Out_Amp and writes the count signal value in the second memory 502 at a timing at which the reference voltage Vr becomes larger than Out_Amp. That is, the second memory 502 holds a signal value obtained by applying the first gain to the first synthesized signal (the signal obtained by adding the noise signal and the first pixel signal).

An output level of Out_Amp at time ta4 is approximately half a saturation signal amount obtained when the pixel signal from PDA and the pixel signal from PDB are combined. Therefore, it is possible to shorten the AD conversion time and to accelerate the processing as compared to the case to be described later. Alternatively, a change amount per unit time of the reference voltage Vr may be decreased to perform AD conversion with higher accuracy without changing the AD conversion time.

At time ta5, the transfer pulses pTXA and pTXB from the pixel 10 change to the High state and the photoelectric conversion signals of the photodiodes PDA and PDB are output. In this case, the switches 201 and 202B are in the conduction state, and signals and noise signals based on the combined signal charges of the PDA and PDB are accumulated in the capacitor 203B. Hereinafter, the signal based on the signal charge of the photodiode PDB will be sometimes referred to as a "second pixel signal". Moreover, a signal obtained by adding the noise signal, the first pixel signal, and the second pixel signal accumulated in the capacitor 203B will be sometimes referred to as a "second synthesized signal".

The reference voltage Vr and the counter 40 are reset at time ta6.

Ramp-up of the reference voltage Vr and counting of the counter 40 start at time ta6. In this case, the switches 201 and 202B are in the non-conduction state, and the switch 204B only is in the conduction state. Therefore, a signal obtained by applying a predetermined gain (in this example, ×8) to the signal accumulated in the capacitor 203B is output from the amplifying unit 20 as Out_Amp. The comparator 30 compares the reference voltage Vr with Out_Amp and writes the count signal value in the third memory 503 at a timing at which the reference voltage Vr becomes larger than Out_Amp. That is, the third memory 503 holds a signal value obtained by applying the first gain to the second synthesized signal (the signal obtained by adding the noise signal, the first pixel signal, and the second pixel signal).

After that, the DSP 80 can acquire the signal (that is, the first pixel signal to which the first gain is applied) of the photodiode PDA in which noise is removed, from the difference between the values held in the first and second memories 501 and 502. Moreover, the DSP 80 can acquire the signal (that is, the second pixel signal to which the first gain is applied) of the photodiode PDB in which noise is removed, from the difference between the values held in the second and third memories 502 and 503. Therefore, it is possible to perform a focal point detection process using these signals.

Here, a signal obtained by combining the first pixel signal based on the charges accumulated in the photodiode PDA and the second pixel signal based on the charges accumulated in the photodiode PDB will be referred to as a third synthesized signal. Since the third synthesized signal cannot be extracted directly from the pixel 10, it is necessary to reduce noise in the DSP 80. The DSP 80 can acquire the signal (that is, the third synthesized signal to which the first gain is applied) of the pixel 10 which is a combination of the photodiodes PDA and PDB, from the difference between the values held in the first and third memories 501 and 503. That is, in the control of the first mode illustrated in FIG. 3A, it is possible to acquire signals for focal point detection and to acquire signals for normal imaging although the gain is constant.

Driving Control in Second Mode

Figure 3B:
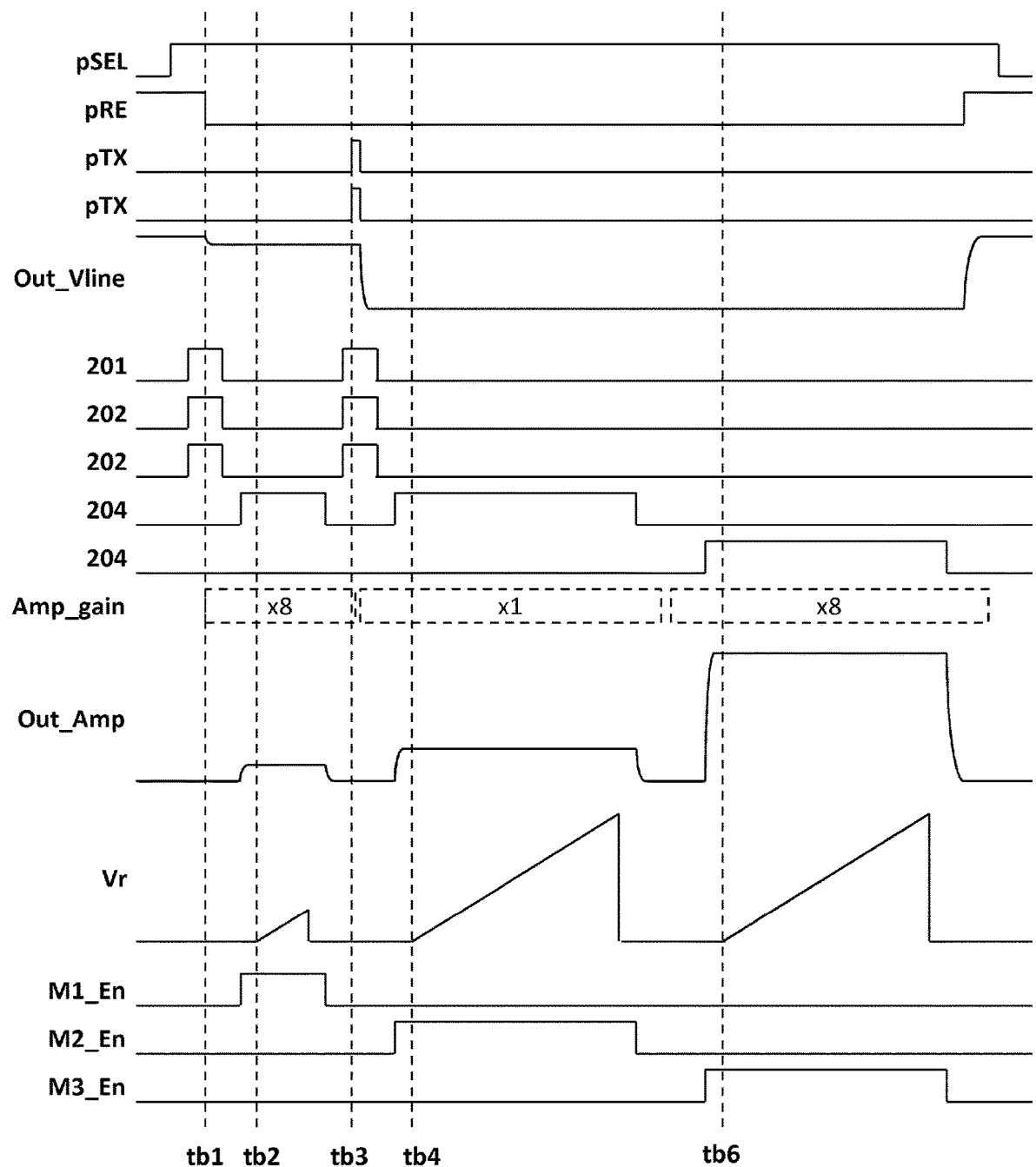
FIG. 3B is a driving timing diagram when a dynamic range is extended according to Embodiment 1.

Next, an operation of pixels capable of extending the dynamic range in the imaging apparatus illustrated in FIG. 1 will be described with reference to the driving timing diagram illustrated in FIG. 3B. The reference numerals used in FIG. 3B are the same as those of FIG. 3A.

Pixel 10 of a specific row are selected according to a selection pulse pSEL prior to time tb1.

At time tb1, signals corresponding to noise signals are output from the pixels 10. In this case, the switches 201, 202A, and 202B are in a condition state, and the noise signals are accumulated in the capacitors 203A and 203B.

Ramp-up of the reference voltage Vr and counting of the counter 40 start at time tb2. In this case, the switches 201, 202A, and 202B are in a non-conduction state, and the switch 204A only is in the conduction state. Therefore, a signal obtained by applying a predetermined gain (in this example, ×8) to the signal accumulated in the capacitor 203A is output from the amplifying unit 20 as Out_Amp. The comparator 30 compares the reference voltage Vr with Out_Amp and writes the count signal value in the first memory 501 at a timing at which the reference voltage Vr becomes larger than Out_Amp. That is, when the predetermined gain of ×8 is a second gain and a pixel signal corresponding to noise is a noise signal, the first memory 501 holds a signal value obtained by applying the second gain to the noise signal. Although the second gain is ×8 and is the same as the first gain in the first mode, the second gain is not limited thereto.

At time tb3, the reference voltage Vr and the counter 40 are reset, the transfer pulses pTXA and pTXB from the pixel 10 change to a High state, and the photoelectric conversion signal of the pixel 10 which is a combination of the photodiodes PDA and PDB are combined the photodiode PDA is output. In this case, the switches 201, 202A, and 202B are in the conduction state, and signals and noise signals based on the signal charges of the pixel 10 which is a combination of the PDA and the PDB are accumulated in the capacitors 203A and 203B. Therefore, a value corresponding to the second synthesized signal is held in both capacitors 203A and 203B.

Ramp-up of the reference voltage Vr and counting of the counter 40 start at time tb4. In this case, the switches 201, 202A, and 202B are in the non-conduction state and the switch 204A only is in the conduction state. Therefore, a signal obtained by applying a predetermined gain (in this example, ×1) to the signal accumulated in the capacitor 203A is output from the amplifying unit 20 as Out_Amp. The comparator 30 compares the reference voltage Vr with Out_Amp and writes the count signal value in the second memory 502 at a timing at which the reference voltage Vr becomes larger than Out_Amp. That is, when the predetermined gain of ×1 is a third gain, the second memory 502 holds a signal value obtained by applying the third gain to the second synthesized signal.

An output level of Out_Amp at time tb4 is smaller by the gain ratio with respect to a saturation signal amount obtained when a gain is applied by the amplifying unit 20 to be described later. Therefore, it is possible to shorten AD conversion time and to accelerate the processing. Alternatively, a change amount per unit time of the reference voltage Vr may be decreased to perform AD conversion with higher accuracy without changing the AD conversion time.

Ramp-up of the reference voltage Vr and counting of the counter 40 start again at time tb6. In this case, the switches 201, 202A, and 202B are in the non-conduction state, and the switch 204B only is in the conduction state. Therefore, a signal obtained by applying a predetermined gain (in this example, ×8 the same as the second gain) to the signal accumulated in the capacitor 203B is output from the amplifying unit 20 as Out_Amp. The comparator 30 compares the reference voltage Vr with Out_Amp and writes the count signal value in the third memory 503 at a timing at which the reference voltage Vr becomes larger than Out_Amp. That is, the third memory 503 holds a signal value obtained by applying the second gain to the second synthesized signal.

After that, the DSP 80 can acquire the signal of the pixel 10 which is a combination of the photodiodes PDA and PDB, in which noise is removed, from the difference between the values held in the first and second memories 501 and 502 as a readout signal with a low gain. The gain of the noise signal stored in the first memory 501 is ×8 and the gain corresponding to the noise signal stored in the second memory 502 is ×1. Therefore, it is necessary to divide the signal stored in the first memory 501 by the gain ratio (in the present embodiment, ×8) before subtracting the signal stored in the first memory 501 from the signal stored in the second memory 502. Although the dividing process can be omitted when the gain used for storing the noise signal in the first memory 501 is set to a third gain (×1), since the noise signal is generally a small value, it is preferable to read the noise signal with a higher gain similarly to the present embodiment.

Moreover, the DSP 80 can acquire the signal of the pixel 10 which is a combination of the photodiodes PDA and PDB, in which noise is removed, from the difference between the values held in the first and third memories 501 and 503 as a readout signal with a high gain.

As described above, in the second mode, it is possible to read a plurality of signals having different amounts of gain in a state in which noise is removed. By combining signals having different gains and imaging a high-brightness subject using signals read with a low gain and imaging a low-brightness subject using signals read with a high gain, it is possible to extend the dynamic range.

Switching Process

An instruction related to a process switching between the first and second modes is input from the TG 70 to the pixel unit 1 via the vertical scanning circuit 15, for example. A parallax other than the DSP can be used as a switching unit that outputs the instruction. The switching unit execute a switching process on the basis of certain standards. For example, the switching process may be performed every frame. When switching is performed in units of frames, the first mode control may be executed once every plurality of frames to read a focal point detection signal. Moreover, the mode may be switched every other row in the same frame. Moreover, readout rows in which focal point detection is performed may be thinned out according to the necessary focal point detection accuracy. Although not illustrated in the drawings, by performing reset driving for completely resetting the readout signals of the photodiodes, it is possible to make the accumulation periods of the two photodiodes completely match each other.

Advantages

As described above, the pixel of the imaging apparatus of the present invention has a plurality of (in this example, two) photodiodes. Due to this, it is possible to switch between a noise signal, a synthesized signal of a pixel signal from any one of the photodiodes and the noise signal, and a synthesized signal of the pixel signals of the two photodiodes and the noise signal as the output of the pixel. Moreover, in the present embodiment, the amplifying unit that processes the output from the pixel has a number of sampling and holding capacitors corresponding to the number of photodiodes. The signals accumulated in the respective sampling and holding capacitors can be switched by controlling switches.

Due to the above-described configuration, the speed control gain can be read any one of in the first mode related to focal point detection and normal imaging and the second mode related to imaging with an extending dynamic range. By performing difference processing using a processing circuit such as the DSP, it is possible to reduce the number of times signals are read and AD conversion is performed. As a result, it is possible to suppress a decrease in frame rate.

According to the above-described control, readout of signals from the photodiodes PDA and PDB can be performed simultaneously. As a result, it is possible to execute correlated double sampling (hereinafter CDS) with high accuracy even when noise signals are not acquired. Since the signal accumulation periods of the photodiodes PDA and PDB completely match each other, it is possible to suppress deterioration of image quality as much as possible, which may occur when a larger amount of light enters one of the photodiodes relative to the other photodiodes.

Embodiment 2

Hereinafter, an imaging apparatus according to Embodiment 2 of the present invention will be described. The portions having the functions similar to those of the previous embodiment will be denoted by the same reference numerals, and the detailed description thereof will be omitted.

Figure 4:
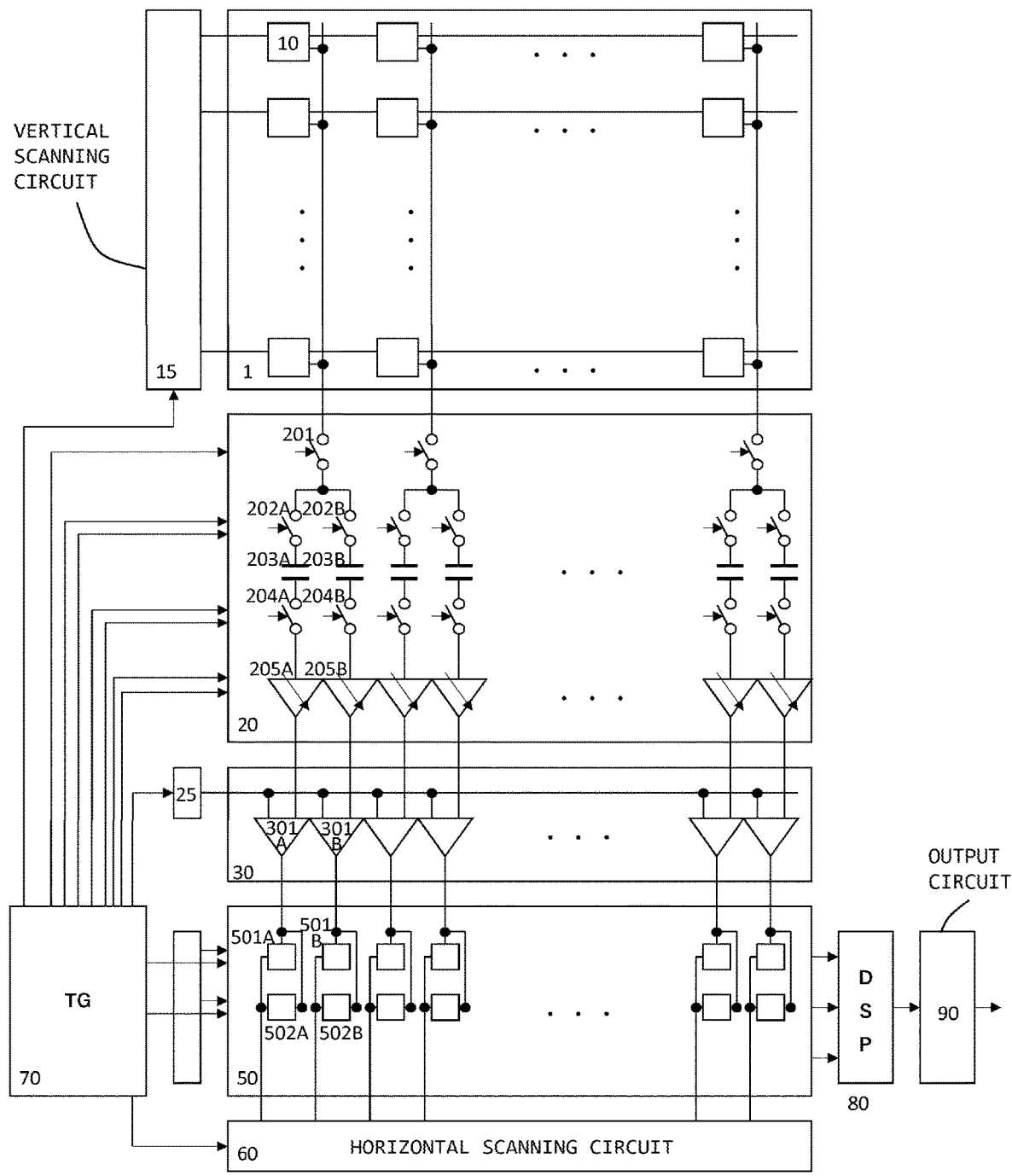
FIG. 4 is a block diagram of an imaging apparatus according to Embodiment 2.

FIG. 4 is a schematic diagram of the imaging apparatus of the present embodiment. The imaging apparatus of the present embodiment includes one vertical output line and two parallel sampling and holding capacitors with respect to a vertical pixel line similarly to Embodiment 1. A difference from Embodiment 1 is that the imaging apparatus of Embodiment 2 includes two variable gain amplifiers 205 of the amplifying unit 20 and two signal processing circuits on the following stage of the amplifying unit. As illustrated in FIG. 4, a first variable gain amplifier 205A and a second variable gain amplifier 205B and a first comparator 301A and a second comparator 301B are present for one pixel line.

In Embodiment 1, since only one signal processing circuit is present on the following stage of the variable gain amplifier 205 of the amplifying unit 20, it is necessary to perform AD conversion sequentially and the frame rate may be limited.

On the other hand, in the present embodiment, signals accumulated in the two sampling and holding capacitors 203A and 203B can be processed in parallel. Therefore, signal processing at time ta4 and signal processing at time ta6 in FIG. 3A can be executed in parallel. Moreover, signal processing at time tb4 and signal processing at time tb6 in FIG. 3B can be executed in parallel.

Therefore, a decrease in frame rate when readout of signals for focal point detection and extending the dynamic range is performed can be suppressed further.

Embodiment 3

Hereinafter, an imaging apparatus according to Embodiment 3 of the present invention will be described. The portions having the functions similar to those of the previous embodiments will be denoted by the same reference numerals, and the detailed description thereof will be omitted.

Figure 5:
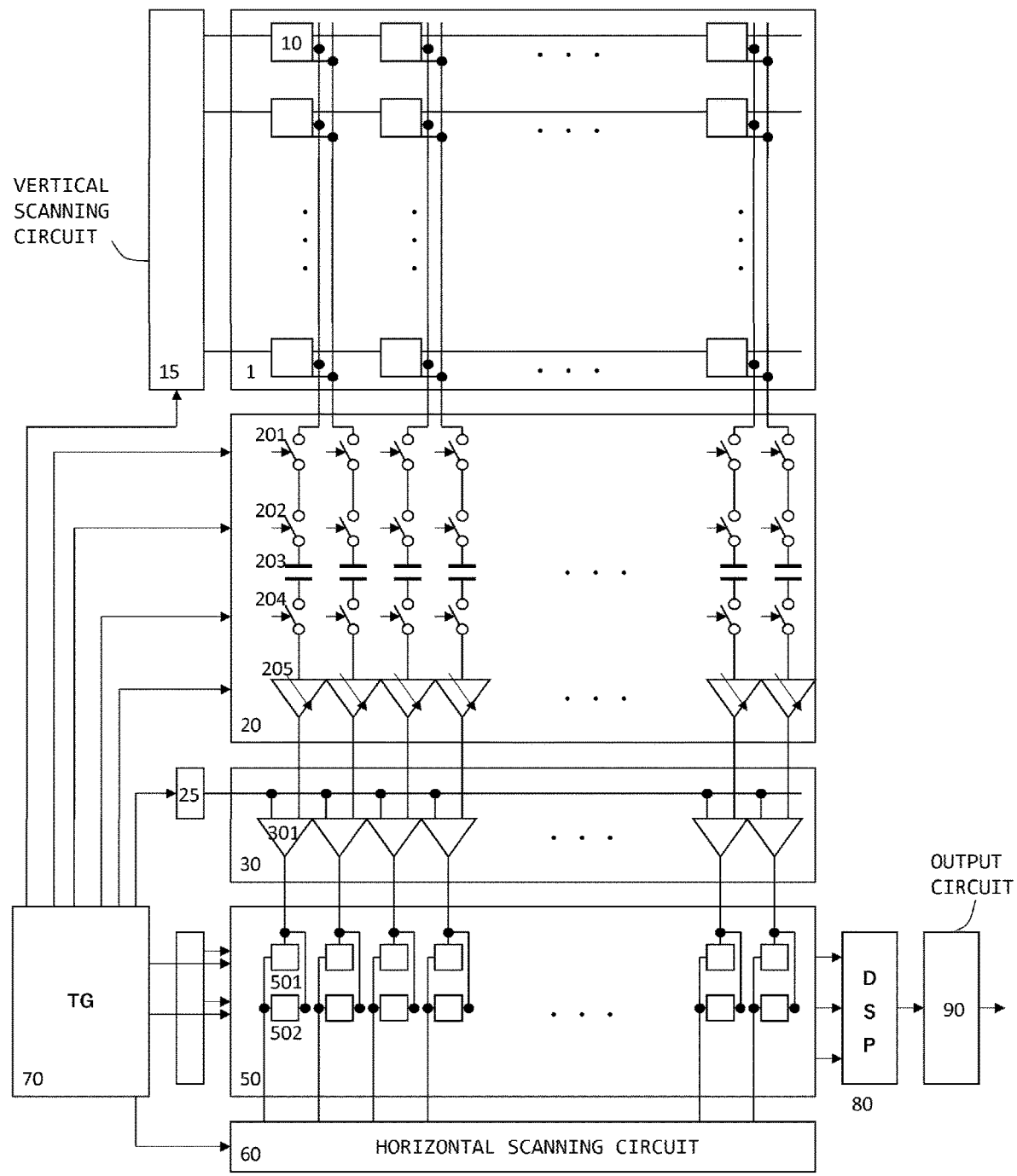
FIG. 5 is a block diagram of an imaging apparatus according to Embodiment 3.
Figure 6:
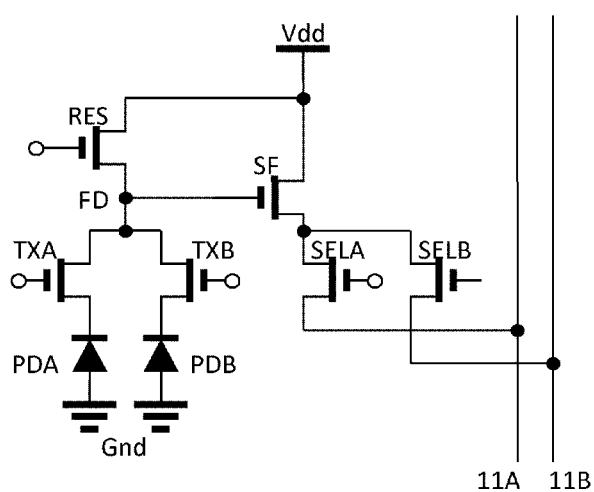
FIG. 6 is a pixel circuit diagram of Embodiment 3.

FIG. 5 is a schematic diagram of an imaging apparatus according to the present embodiment and FIG. 6 is a schematic diagram of a pixel of the present embodiment. The following is the difference from the previous embodiments. That is, the pixel 10 has two row selection transistors SELA and SELB which are connected to vertical output lines 11A and 11B, respectively. That is, two following stage elements are present for the pixel.

In the previous embodiments, since only one vertical output line 11 is present, when signals from the pixel 10 are read a plurality of times, the time required for settling when the signal of the vertical output line 11 varies needs to be secured every readout timing. Furthermore, since a plurality of sampling and holding capacitors are connected to one vertical output line 11, the parasitic capacitor of a signal line increases and the time required for reading signals stably increases. Due to the above-mentioned reasons, the frame rate may be limited.

On the other hand, in the present embodiment, similarly to Embodiment 2, the signal processing at time ta4, the signal processing at time ta6, the signal processing at time tb4, and the signal processing at time tb6 can be performed in parallel. In addition, it is possible to shorten the time required for settling of the vertical output lines 11A and 11B.

Therefore, a decrease in frame rate when readout of signals for focal point detection and extending the dynamic range is performed can be suppressed further.

Although another noise readout operation is necessary, by outputting the signals of the photodiodes PDA and PDB so as to be distributed to the vertical output lines 11A and 11B, it is possible to suppress an amplitude of signals in the vertical output lines and to narrow the bandwidth of the readout signal. As a result, it is possible to suppress noise effectively.

Furthermore, the signal amount when AD conversion is performed is suppressed approximately by half the saturation signal amount when PDA and PDB are combined. Therefore, it is possible to shorten the AD conversion time. Alternatively, a change amount per unit time of the reference voltage Vr may be decreased to perform AD conversion with higher accuracy without changing the AD conversion time.

When the signals of the photodiodes PDA and PDB are output separately as described above, the signals of the photodiodes PDA and PDB need to be subjected to an addition process at the following stage in order to obtain the signal of the entire pixel.

The adding unit on the following stage may be disposed in the DSP 80 and may be disposed in the imaging apparatus. Moreover, the adding unit may be disposed on a preceding stage of the DSP 80.

Embodiment 4

Hereinafter, an imaging apparatus according to Embodiment 4 of the present invention will be described. The portions having the functions similar to those of the previous embodiments will be denoted by the same reference numerals, and the detailed description thereof will be omitted.

Figure 7:
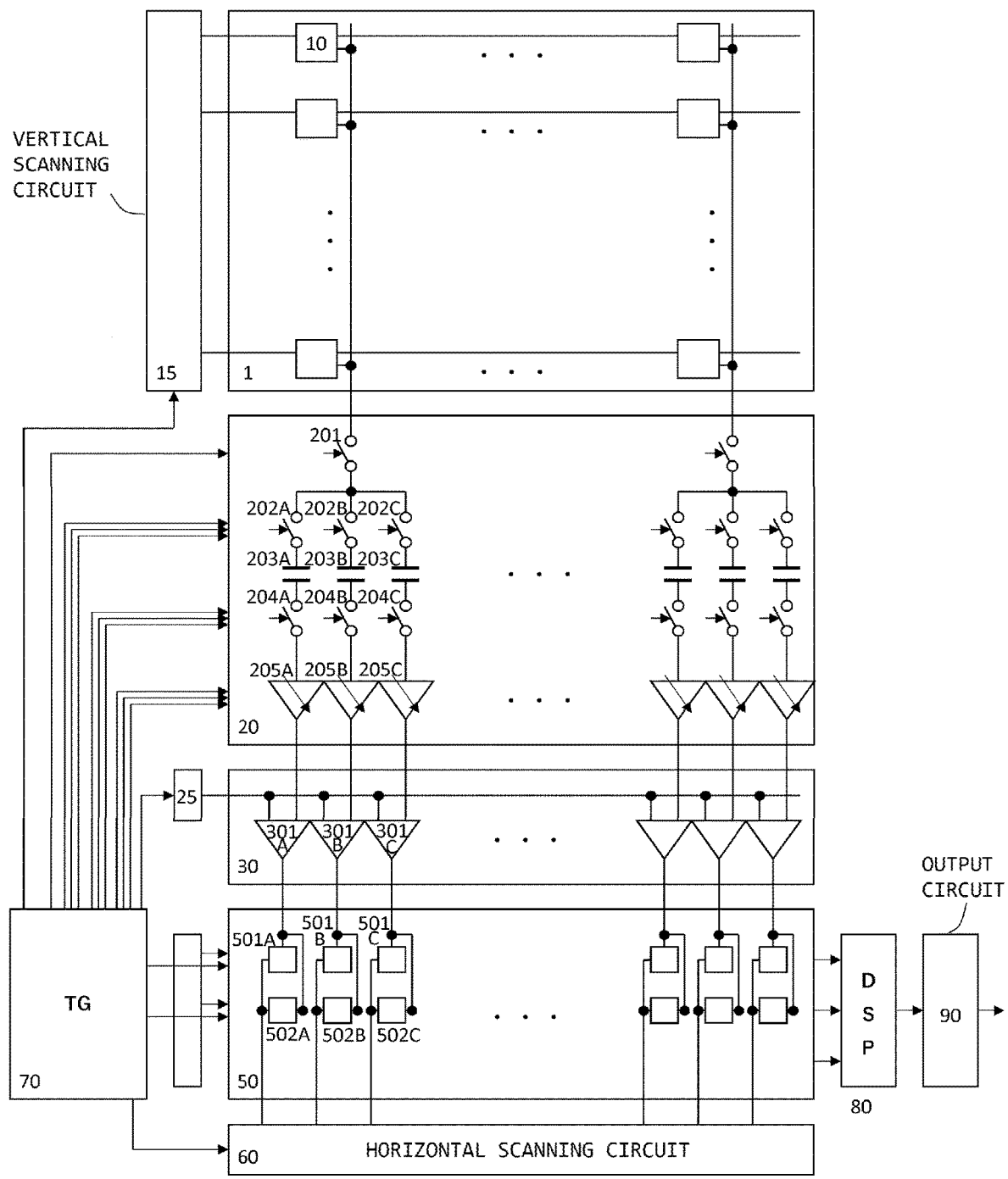
FIG. 7 is a block diagram of an imaging apparatus according to Embodiment 4.

FIG. 7 is a schematic diagram of an imaging apparatus according to the present embodiment. In the previous embodiments, signals are processed in parallel by a two-parallel structure. On the other hand, in the present embodiment, a third sampling and holding capacitor is added and parallel processing is performed by a three parallel-structure. That is, in the present embodiment, a three-parallel structure is present on the following stage of the sampling and holding capacitors. The sampling and holding capacitors 203A to 203C have the corresponding variable gain amplifiers 205A to 205C, comparators 301A to 301C, first memories 501A to 501C, and second memories 502A to 502C, respectively.

In the previous embodiments, readout (first mode) for focal point detection on the imaging plane and readout (second mode) for dynamic range extension so that different gains are used in the amplifying units need to be performed in different frames or different rows.

On the other hand, three pixel output signals can be processed in parallel. Therefore, readout for focal point detection and readout for dynamic range extension can be performed during processing of the same frame or the same row.

Specifically, for example, the count value of the noise signal is recorded in the first memories 501A, 501B, and 501C. Moreover, the count values (related to a first synthesized signal) of the signal and the noise signal of the photodiode PDA are recorded in the second memory 502A. Moreover, the count values (related to a second synthesized signal) of the signals and the noise signals of the combination of the photodiodes PDA and PDB are recorded in the second memories 502B and 502C. The gain of the amplifying unit 20 used for the second memory 502B is different from the gain used for the second memory 502C.

Subsequently, the DSP 80 calculates a difference between the values held in the first and second memories, whereby signals for focal point detection and extending the dynamic range can be obtained similarly to the previous embodiments. According to the present embodiment, it is possible to obtain high-quality images with a wide dynamic range while suppressing a decrease in frame rate.

FIG. 7 illustrates an example in which all structures on the following stage of the amplifying unit 20 are a three-parallel structure. However, only the sampling and holding capacitor may have a three-parallel structure. Moreover, all structures on the following stage of the row selection transistor of the pixel 10 may have a three-parallel structure. In any configuration, processing can be performed in parallel and the frame rate can be improved. Such a three-parallel structure as in the present embodiment can be appropriately combined with a circuit configuration of the above-described respective embodiments.

Embodiment 5

Hereinafter, an imaging apparatus according to Embodiment 5 of the present invention will be described. The portions having the functions similar to those of the previous embodiments will be denoted by the same reference numerals, and the detailed description thereof will be omitted.

Figure 8A:
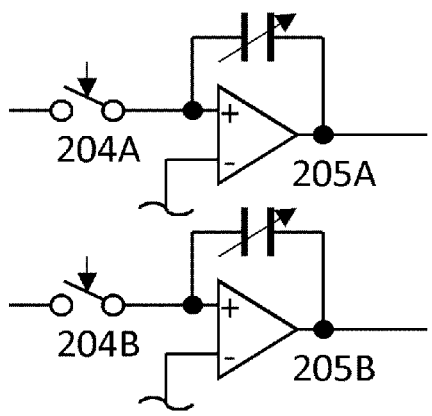
FIGS. 8A and 8B are circuit diagrams of an amplifying unit according to Embodiment 5.
Figure 8B:
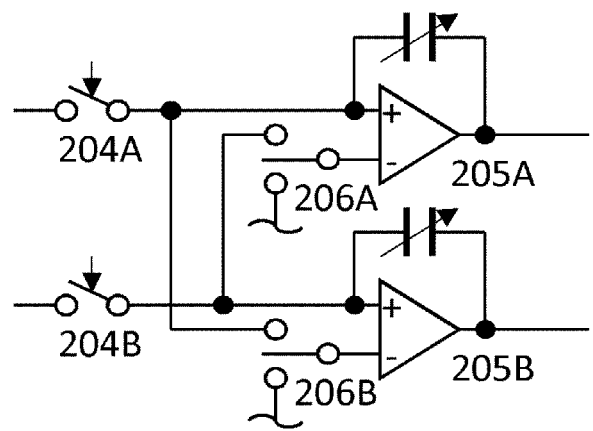

FIGS. 8A and 8B illustrate part of the amplifying unit 20 of the imaging apparatus according to the present embodiment and illustrate a specific circuit near a variable gain amplifier of the amplifying unit 20. FIG. 8A illustrates a configuration of a basic switch 204 and a variable gain amplifier 205. A feedback capacitor on an upper part of the variable gain amplifier 205 is variable so that the gain of the amplifying unit 20 is variable. A signal obtained by applying a gain to the difference between the inputs of the differential pair of the variable gain amplifier 205 is output to the following stage circuit.

When signal processing for the focal point detection described in Embodiment 1 is performed using the configuration illustrated in FIG. 8A, a signal and a noise signal based on the signal charge of the photodiode PDA are first output to the variable gain amplifier 205A. Subsequently, a signal and a noise signal based on the signal charges of a combination of the photodiodes PDA and PDB are output to the variable gain amplifier 205B. Subsequently, the difference between the signals are calculated by a following stage circuit whereby a signal component originating from the photodiode PDB in which noise is removed can be extracted. Therefore, even when information for the focal point detection only is to be obtained, the processing of the following stage circuit is necessary.

Next, signal processing using the configuration illustrated in FIG. 8B which is the configuration of the present embodiment will be described. The difference from FIG. 8A is that a switch 206B is connected to a negative input side of the differential pair of the variable gain amplifier 205B which is a second amplifier. The switch 206B enables an input signal to the negative input to be selected from a reference voltage source and a positive-input-side signal of another variable gain amplifier 205A which is a first amplifier.

In the present embodiment, first, using this configuration, a signal and a noise signal based on the signal charge of the photodiode PDA are output to the variable gain amplifier 205A in a state in which the switch 206A is connected to the reference voltage source side. Subsequently, the switch 206B is connected to the positive input side of the variable gain amplifier 205A. In this case, a signal and a noise signal based on the signal charge of a combination of the photodiodes PDA and PDB are input to the positive input side of the variable gain amplifier 205B. And a signal and a noise signal based on the signal charge of the photodiode PDA are input to the negative input side of the variable gain amplifier 205B. As a result, a signal based on the signal charge of the photodiode PDB can be obtained as the output of the variable gain amplifier 205B, and the processing of the following stage circuit is not necessary.

According to the above-described configuration, it is possible to simplify the processing of the following stage circuit and to suppress noise components superimposed on the following stage circuit to extract a desired signal with high accuracy.

This configuration can be used without being limited to extracting signals for the focal point detection. For example, this configuration may be used when removing noise signals from the signal and the noise signal based on the signal charge of the photodiode PDA. Moreover, although the switches 206A and 206B are provided on both sides in FIG. 8B, the switch may be provided on only one side.

Embodiment 6

Hereinafter, an imaging apparatus according to Embodiment 6 of the present invention will be described. The portions having the functions similar to those of the previous embodiments will be denoted by the same reference numerals, and the detailed description thereof will be omitted.

Figure 9A:
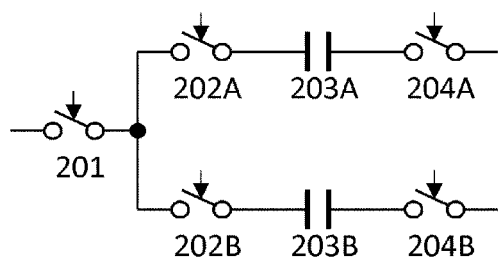
FIGS. 9A and 9B are circuit diagrams of an amplifying unit according to Embodiment 6.
Figure 9B:
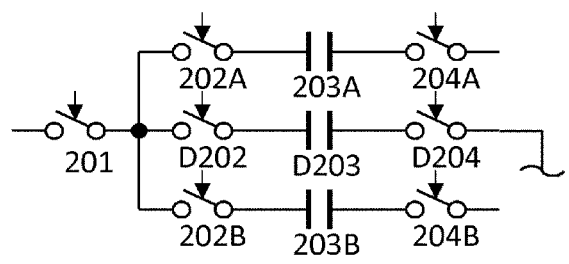

FIGS. 9A and 9B illustrate part of the amplifying unit 20 of the imaging apparatus according to the present embodiment and illustrate a specific configuration near the sampling and holding capacitor of the amplifying unit 20. FIG. 9A illustrates a basic configuration similar to that of FIGS. 1 and 4. In this configuration, signals to be accumulated in the sampling and holding capacitor can be selected by switching the switches 201, 202A, and 202B appropriately.

When signal processing for the focal point detection described in Embodiment 1 is performed using the configuration illustrated in FIG. 9A, first, the switches 201, 202A, and 202B are connected so that a noise signal is accumulated in the capacitors 203A and 203B. Subsequently, the switch 202B is disconnected so that a signal and a noise signal based on the signal charge of the photodiode PDA are accumulated in the capacitor 203A only (a first synthesized signal). Subsequently, the switch 202A is disconnected and the switch 202B is connected so that a signal and a noise signal based on the signal charge of a combination of the photodiodes PDA and PDB are accumulated in the capacitor 203B (a second synthesized signal). In this case, the load (that is, the capacitors 203A and 203B) on the input side of the amplifying unit 20 when the noise signal was accumulated first is different from the load (that is, the capacitor 203A or 203B) on the input side of the amplifying unit 20 when the signal based on the signal charge is accumulated. When the load is different, the CDS may not be executed with high accuracy.

Next, signal processing using the configuration illustrated in FIG. 9B which is the configuration of the present embodiment will be described. The difference from FIG. 9A is that dummy elements D202, D203, and D204 are added. A reference voltage source is connected to an end of the dummy switch D204.

An accumulation operation of this configuration will be described. When a noise signal is to be accumulated, the switches 202A and 202B are connected and the dummy switch D202 is put into a non-conduction state. Subsequently, when a signal and a noise signal based on the signal charge of the photodiode PDA are to be accumulated, the switch 202A and the dummy switch D202 are connected and the switch 202B is put into a non-conduction state. Furthermore, when a signal and a noise signal based on the signal charge of a combination of the photodiodes PDA and PDB are to be accumulated, the switch 202B and the dummy switch D202 are connected and the switch 202A is put into a non-conduction state. In this case, the load on the input side of the amplifying unit 20 is substantially equal in any accumulation operation and the accuracy of the CDS can be improved.

In order to make the load on the input side of the amplifying unit 20 approximately equal, elements having characteristic values substantially similar to those of the switch 202, the capacitor 203, and the switch 204 may be used as the dummy elements D202 to D204, respectively. The characteristic values of the elements may be a gate length, a gate width, a capacitance value of a transistor. According to the above-described configuration, it is possible to execute CDS with high accuracy and to extract higher-quality image signals.

Modification

In the above-described embodiments, the amplifying unit 20 performs sampling and holding on the pixel signal which is an analog electrical signal output from the pixel unit 1, and a processing result obtained by the comparator 30 is output to the memory unit 50 as a digital value. However, the subject of the sampling and holding is not limited to the analog signal but the sampling and holding may be performed on a digital signal obtained by AD conversion. In this case, the imaging apparatus includes a circuit that outputs a digital signal on the preceding stage of the sampling and holding capacitor.

In such a configuration, the advantages of the present invention are obtained when a plurality of sampling and holding capacitors are arranged in the pixel 10 and accumulation of a noise signal and digital signals originating from the photodiodes PDA and PDB is switched using switches similarly to the above-described embodiments.

In the above-described embodiments, a circuit configuration and a driving method of the imaging apparatus according to the present invention and the advantages thereof have been described. That is, according to the present invention, it is possible to provide a solid-state imaging apparatus capable of detecting a focal point on an imaging plane and reading signals with a wide dynamic range while suppressing a decrease in frame rate.

Other Embodiments

While the present invention has been described by way of an example of specific embodiments, the present invention is not limited to the above-described embodiments and various modifications and combinations may occur without departing from the object and the scope of the present invention. Various application examples and modifications of the present invention will be described below.

Example where a Plurality of Substrates are Used

The present invention is not limited to a case in which the signal processing circuit is formed on the same substrate. That is, the present invention can be applied to a configuration in which an imaging apparatus is formed using a plurality of substrates. Moreover, signals for focal point detection and signals for dynamic range extension may be processed on different substrates.

Configuration Example of Pixel Unit

Figure 10A:
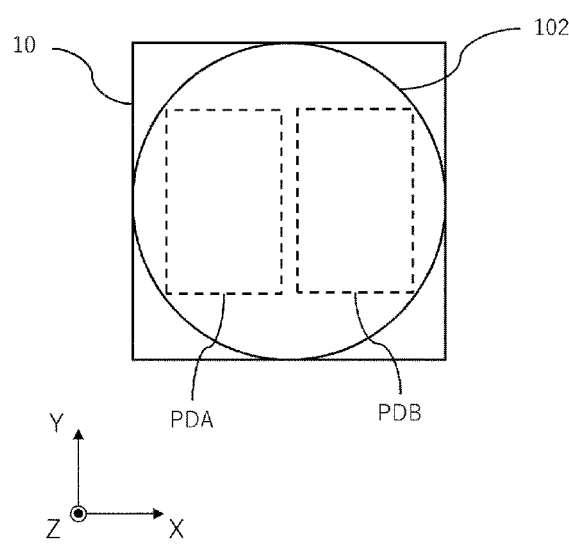
FIGS. 10A and 10B are schematic diagrams of pixels included in a pixel unit.

A configuration of the pixel 10 will be described with reference to FIGS. 10A and 10B. FIG. 10A is a schematic diagram when one pixel 10 of the pixel unit 1 is seen in a direction of facing a principal surface of the substrate of the imaging apparatus.

One pixel 10 includes one microlens 102. A microlens can be formed by photolithography using a gray tone mask. The photodiodes PDA and PDB included in the pixel 10 are depicted perspectively by broken lines. The pixels 10 are arranged in an array form whereby the pixel unit 1 is formed.

Figure 10B:
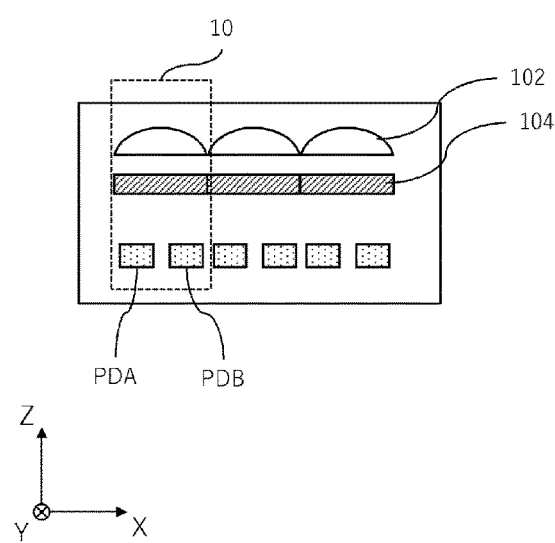

FIG. 10B is a cross-sectional view of a part of the pixel unit 1. In one pixel 10, a color filter 104 and a microlens 102 are provided above the photodiodes formed on a substrate. A pattern in which three filters of the three colors of green, blue, and red are arranged in the Bayer arrangement, for example, may be used as the color filter 104. Pigments, dyes, or hybrid compositions thereof may be used as a color material of the color filter.

Application Example to Image Pickup System

Figure 11:
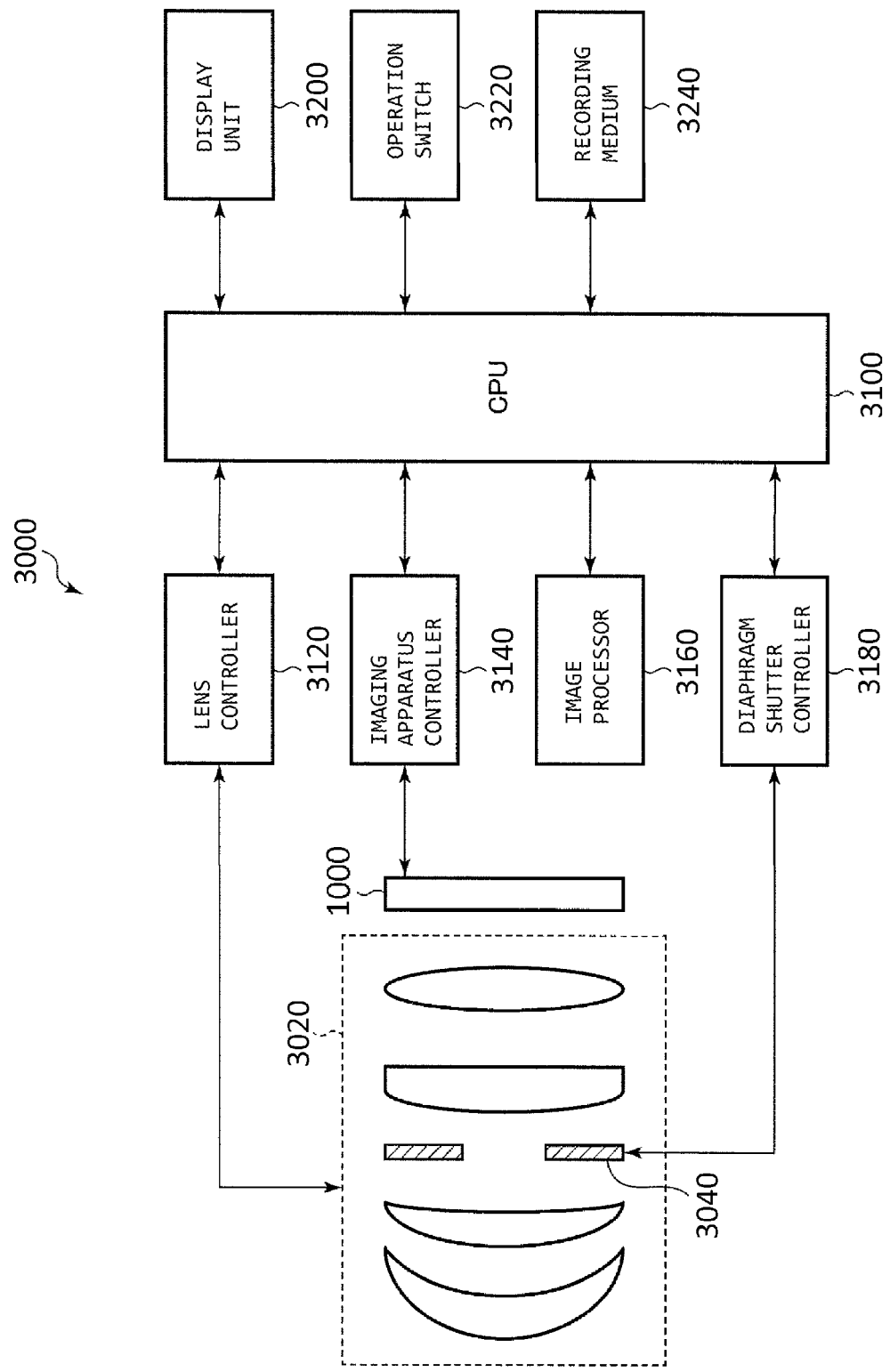
FIG. 11 is a block diagram illustrating a schematic configuration of an imaging system which uses an imaging apparatus.

An application example to an imaging system according to the present invention will be described with reference to FIG. 11.

The solid state imaging apparatuses (hereinafter collectively referred to as an imaging apparatus 1000) described in the respective embodiments can be applied to various imaging systems. An applicable imaging system is not particularly limited, and examples thereof include a digital still camera, a digital camcorder, a surveillance camera, a copying machine, a facsimile, a cellular phone, an in-vehicle camera, and an observation satellite. Moreover, a camera module including an optical system such as a lens and an imaging apparatus is also included in the imaging system. FIG. 11 illustrates a block diagram of a digital still camera as an example of theses imaging systems.

An imaging system 3000 includes an imaging optical system 3020, a CPU 3100, a lens controller 3120, an imaging apparatus controller 3140, an image processor 3160, a diaphragm shutter controller 3180, a display unit 3200, an operation switch 3220, and a recording medium 3240.

The imaging optical system 3020 is an optical system for forming an optical image of a subject and includes a lens group, a diaphragm 3040, and the like. The diaphragm 3040 includes a function of adjusting a light quantity during photographing by adjusting an opening diameter thereof and a function of an exposure adjustment shutter during photographing of still images. The lens group and the diaphragm 3040 are held to advance and retract in an optical axis direction and realize a magnification changing function (a zooming function) and a focusing adjustment function with the interlocked operation. The imaging optical system 3020 may be integrated with the imaging system and may be an imaging lens that can be attached to the imaging system.

The imaging apparatus 1000 is disposed in an image space of the imaging optical system 3020 so that an imaging plane is positioned therein. The imaging apparatus 1000 is the solid state imaging apparatus described in the embodiment and is configured to include a CMOS sensor (a pixel region) and a peripheral circuit (a peripheral circuit region) thereof. The imaging apparatus 1000 forms a two-dimensional single-panel color sensor such that pixels having a plurality of photoelectric converting portions are arranged two-dimensionally and color filters are disposed in these pixels. The imaging apparatus 1000 photoelectrically converts a subject image picked up by the imaging optical system 3020 and outputs the subject image as an image signal or a focal point detection signal.

The lens controller 3120 has a function of controlling movement of the lens group of the imaging optical system 3020 to change a magnification and adjust a focal point and is configured as a circuit or a processing device configured to realize the function. The diaphragm shutter controller 3180 has a function of adjusting an imaging light quantity by changing an opening diameter of the diaphragm 3040 (by varying an f-number) and is configured as a circuit or a processing device configured to realize the function.

The CPU 3100 is a control device in a camera that controls various operations of a camera body and includes an arithmetic unit, a ROM, a RAM, an A/D converter, a D/A converter, a communication interface circuit, and the like. The CPU 3100 controls operations of various units in the camera according to a computer program stored in a ROM or the like to execute a series of photographing operations such as AF, imaging, image processing, and recording including focal pointing state detection (focal point detection) of the imaging optical system 3020. The CPU 3100 is also a signal processor.

The imaging apparatus controller 3140 has functions of controlling an operation of the imaging apparatus 1000 and A/D converting signals output from the imaging apparatus 1000 to output the same to the CPU 3100 and is configured as a circuit or a control device configured to realize the functions. The A/D conversion function may be included in the imaging apparatus 1000. The image processor 3160 has a function of performing image processing, such as γ-conversion or color interpolation, on the A/D-converted signals to generate image signals and is configured as a circuit or a control device configured to realize the function. The display unit 3200 is a display device such as a liquid crystal display device (LCD) and displays information on a camera photographing mode, a preview image before photographing, a confirmation image after photographing, a focal pointing state during focal point detection, and the like. The operation switch 3220 includes a power switch, a release (photographing trigger) switch, a zoom switch, a photographing mode selection switch, and the like.

The recording medium 3240 records photographed images and the like and may be included in the imaging system and may be detachably attached to the imaging system like a memory card.

In this manner, by forming the imaging system 3000 to which the imaging apparatuses 1000 of the respective embodiments, it is possible to realize a high-performance imaging system capable of adjusting a focal point with high accuracy and acquiring images with a high depth of field.

Application Example to Mobile Object

Figure 12A:
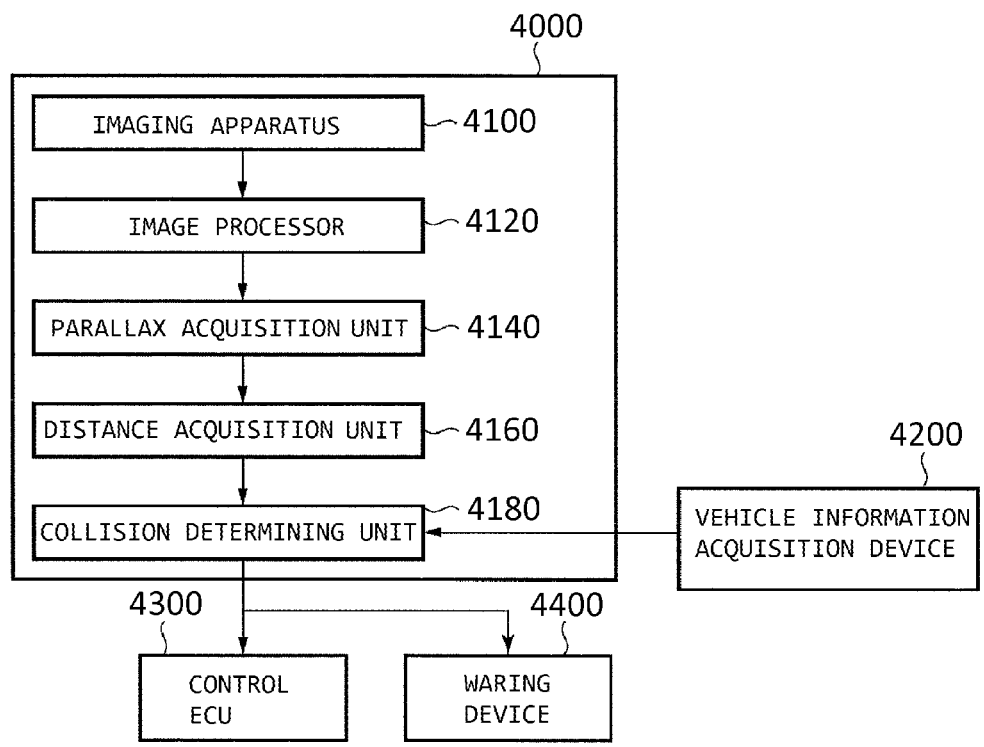
FIGS. 12A and 12B are diagrams illustrating a system and a mobile object which use an imaging apparatus.
Figure 12B:
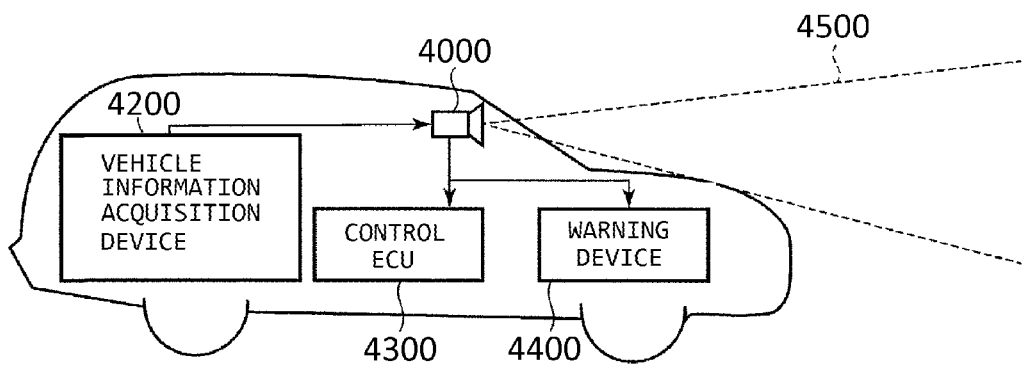

An imaging system and a mobile object according to the present invention will be described with reference to FIGS. 12A and 12B. FIG. 12A illustrates an example of an imaging system 4000 of an in-vehicle camera. The imaging system 4000 includes an imaging apparatus 4100. The imaging apparatus 4100 is any one of the solid state imaging apparatuses described in the respective embodiments. The imaging system 4000 includes an image processor 4120 that performs image processing on a plurality of pieces of image data acquired by the imaging apparatus 4100 and a parallax acquisition unit 4140 that calculates a parallax (a phase difference of parallax images) from the plurality of pieces of image data acquired by the imaging apparatus 4100. The imaging system 4000 also includes a distance acquisition unit 4160 that calculates a distance to an object on the basis of the calculated parallax and a collision determining unit 4180 that determines the possibility of collision on the basis of the calculated distance. Here, the parallax acquisition unit 4140 and the distance acquisition unit 4160 is an example of a distance information acquisition unit that acquires distance information to an object. That is, the distance information is information on a parallax, a defocus point amount, and a distance or the like to an object. The collision determining unit 4180 may determine the possibility of collision using any one of these pieces of distance information. The distance information acquisition unit may be realized as dedicated hardware and may be realized as a software module. Moreover, the distance information acquisition unit may be realized as a field programmable gate array (FPGA), an application specific integrated circuit (ASIC), or the like and may be realized as a combination thereof.

The imaging system 4000 is connected to a vehicle information acquisition device 4200 and can acquire vehicle information such as a vehicle speed, a yaw rate, and a steering angle. Moreover, the imaging system 4000 is connected to a control ECU 4300 which is a control device that outputs a control signal for generating a braking force with respect to a vehicle on the basis of a determination result obtained by the collision determining unit 4180. That is, the control ECU 4300 is a mobile object controlling unit that controls a mobile object on the basis of distance information. Moreover, the imaging system 4000 is also connected to a warning device 4400 that issues a warning to a driver on the basis of a determination result obtained by the collision determining unit 4180. For example, when the collision determining unit 4180 determines that the possibility of collision is high, the control ECU 4300 performs vehicle control to avoid collision to alleviate injury by applying the brake, removing the force applied to an accelerator pedal, and suppressing engine output. The warning device 4400 warns users by issuing warning such as sound, displaying warning information on a screen of a navigation system or the like, or vibrating a seat belt or a steering wheel.

In the present embodiment, the surroundings (for example, front or rear sides) of a vehicle are photographed by the imaging system 4000. FIG. 12B illustrates the imaging system 4000 when the front side of a vehicle (an imaging range 4500) is photographed. A vehicle information acquisition device 4200 outputs instructions so that the imaging system 4000 is operated to execute a photographing operation. By using the solid state imaging apparatus of the respective embodiments as the imaging apparatus 4100, the imaging system 4000 of the present embodiment can further improve distance measurement accuracy.

In the above description, although an example of performing control so that a vehicle does not collide with other vehicles has been described, the present invention can be applied to automated drive control for traveling so as to follow another vehicle and automated drive control for traveling so as not to deviate from a lane. The imaging system is not limited to a vehicle such as an automobile but can be also applied to a mobile object (a movable device) such as a ship, an airplane, or an industrial robot. Furthermore, the present invention is not limited to a mobile object but can be broadly applied to an apparatus which uses object recognition such as an intelligent transport system (ITS).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-018431, filed on Feb. 5, 2018, which is hereby incorporated by reference herein in its entirety.

What is claimed is:

1. An apparatus comprising:
   a first photoelectric converting portion and a second photoelectric converting portion;
   a charge detecting portion connected in common to the first photoelectric converting portion and the second photoelectric converting portion;
   a circuit configured to output a pixel signal corresponding to a potential of the charge detecting portion;
   a first sampling and holding capacitor and a second sampling and holding capacitor configured to hold the pixel signal;
   an amplifier configured to amplify the pixel signal held in the first sampling and holding capacitor or the second sampling and holding capacitor; and
   a controlling unit configured to control a gain used when the amplifier amplifies the pixel signal held in the sampling and holding capacitor and perform control in a first mode and a second mode,
   wherein
   (1) the pixel signal is any one of:
   a first signal corresponding to a potential of the charge detecting portion at a time of resetting the charge detecting portion;
   a second signal including a first component based on charges of the first photoelectric converting portion and a noise component based on noise of the charge detecting portion; and
   a third signal including the first component, a second component based on charges of the second photoelectric converting portion, and a noise component based on noise of the charge detecting portion;
   (2) in the first mode, the controlling unit performs control so that the amplifier amplifies, with a first gain, the first signal, the second signal held in the first sampling and holding capacitor, and the third signal held in the second sampling and holding capacitor, and
   (3) in the second mode, the controlling unit performs control so that the amplifier amplifies the third signal held in the second sampling and holding capacitor with a second gain, and the amplifier amplifies the third signal held in the first sampling and holding capacitor with a third gain lower than the second gain.

2. The apparatus according to claim 1, further comprising a processing unit configured to:
   acquire a signal corresponding to the first component amplified with the first gain and a signal corresponding to the second component amplified with the first gain, on the basis of a signal obtained in the first mode; and
   acquire a signal corresponding to the first and second components amplified with the second gain and a signal corresponding to the first and second components amplified with the third gain, on the basis of a signal obtained in the second mode.

3. The apparatus according to claim 1, further comprising a switching unit configured to switch an operation of the controlling unit between the first mode and the second mode.

4. The apparatus according to claim 3, wherein a plurality of the transistors are provided in a matrix form, and the pixel signals from the plurality of transistors are processed in respective frames, and
the switching unit switches the first mode and the second mode in the respective frames.

5. The apparatus according to claim 3, wherein a plurality of the transistors are provided in a matrix form, and the pixel signals from the plurality of transistors are processed in respective rows, and
the switching unit switches the first mode and the second mode in the respective rows.

6. The apparatus according to claim 1, wherein the amplifier includes a first amplifier corresponding to the first sampling and holding capacitor and a second amplifier corresponding to the second sampling and holding capacitor.

7. The apparatus according to claim 6, further comprising a switch configured to enable an input signal to a negative input of a differential pair of the second amplifier to be selected between a reference voltage source and an input signal to a positive input of the first amplifier.

8. The apparatus according to claim 1, wherein the transistor is connected to a plurality of output lines respectively corresponding to the first sampling and holding capacitor and the second sampling and holding capacitor.

9. The apparatus according to claim 1, further comprising a third sampling and holding capacitor configured to hold the pixel signal.

10. The apparatus according to claim 1, further comprising a dummy element connected in parallel to the first sampling and holding capacitor and the second sampling and holding capacitor.

11. The apparatus according to claim 1, further comprising an AD converting unit configured to perform AD conversion on the pixel signal.

12. A system comprising:
the apparatus according to claim 1; and
a signal processing unit configured to process a signal output from the apparatus.

13. A mobile object comprising:
the apparatus according to claim 1;
an information acquiring unit configured to acquire information from a signal output from the apparatus; and
a mobile object controlling unit configured to control the mobile object on the basis of the information.

14. The apparatus according to claim 1, wherein in the second mode, the controlling unit performs control so that the amplifier amplifies the first signal with the second gain.

15. The apparatus according to claim 1, wherein the second gain is equivalent to the first gain.

16. The apparatus according to claim 1, wherein the pixel signal on which the sampling and holding is performed is a digital signal obtained by AD conversion.

17. The apparatus according to claim 1, further comprising a plurality of microlenses, wherein one microlens of the plurality of microlenses is provided above the first photoelectric converting portion and the second photoelectric converting portion.

18. The apparatus according to claim 17, further comprising:
a first transfer transistor which transfers a charge of the first photoelectric converting portion to the charge detecting portion; and
a second transfer transistor which transfers a charge of the second photoelectric converting portion to the charge detecting portion.

19. A system comprising:
the apparatus according to claim 1; and
a signal processing unit configured to process a signal output from the apparatus, wherein a focal point detection is performed with the first mode, and
wherein an extension of a dynamic range is performed with the second mode.

20. The system according to claim 19, wherein the apparatus executes correlated double sampling.

* * * * *